United States Patent [19]

Stone et al.

[11] Patent Number: 4,601,308
[45] Date of Patent: Jul. 22, 1986

[54] BALL VALVE WITH SEAT LOADING MECHANISM

[75] Inventors: Ralph S. Stone, Missouri City; William S. Shelton, Houston, both of Tex.

[73] Assignee: Joy Manufacturing Company, Pittsburgh, Pa.

[21] Appl. No.: 814,360

[22] Filed: Dec. 30, 1985

[51] Int. Cl.$^4$ .............................................. F16H 43/00
[52] U.S. Cl. ................................... 137/315; 137/327; 251/174; 251/316; 251/360; 251/363
[58] Field of Search ............... 251/174, 315, 316, 360, 251/362, 363; 137/327, 315

[56] References Cited

U.S. PATENT DOCUMENTS

| | | | |
|---|---|---|---|
| 3,480,253 | 11/1969 | Priese | 251/174 |
| 4,151,855 | 5/1979 | Levin | 251/174 X |
| 4,246,928 | 1/1981 | Burns | 137/315 |
| 4,388,945 | 6/1983 | Johnson | 251/174 X |
| 4,566,482 | 1/1986 | Stunkard | 251/315 X |

FOREIGN PATENT DOCUMENTS 781655 8/1957 United Kingdom ................ 251/174

Primary Examiner—Harold W. Weakley
Attorney, Agent, or Firm—Marvin J. Marnock

[57] ABSTRACT

A top-entry ball valve 10 comprising a valve body 12 having a chamber 13, flow passages 14, 15, a ball 20 rotatably mounted in the chamber for movement between open and closed positions relative to the passages, and a pair of seat assemblies 50 at opposed sides of the ball which may be loaded into engagement with the ball or disengaged therefrom. Each seat assembly 50 comprises a seat ring 51 having a rear portion 51a, a larger diameter portion 51b which forms a shoulder 51c, and a face seal 59. Three pins 65 in the seat ring 51 in equiangular spaced relation project from the shoulder 51c. A spacer ring 53 sleeved about the rear 51a of the seat ring 51 is provided with recesses 68 adapted to receive the pins 65. The spacer 53 is mounted for movement between a first position where it is engaged by the tips of pins 65 and a second position wherein the pins 65 are in the recesses 68. A spring assembly 66 between the spacer 53 and a shoulder 42 of seat pocket 35 continuously urges the spacer to its first or second positions. The bar may be used to pry the spacer from shoulder 51c and the seat assembly towards the ball 20. A pin 71 on the spacer 53, when the valve cover 28 is removed, may be engaged by a pry bar to move and rotate the spacer to its first or second positions. The bar may be used to pry the spacer from shoulder 51c and re-orient the spacer so the seat ring is loaded against the ball 20. Placing the spacer 53 in its second position, retracts the seat from ball 20 and adapts the valve for in-line removal of ball and seats.

5 Claims, 3 Drawing Figures

BALL VALVE WITH SEAT LOADING MECHANISM

BACKGROUND OF THE INVENTION

This invention relates generally to ball valves, and more particularly to a top-entry ball valve which allows for easy in-line removal of the valve seat rings and easy loading of the valve seat rings in the valve body cavity.

Heretofore, there have been devised various ball valve designs and constructions which permit the removal of the ball valve element from the valve body for replacement or repair of the seat rings. For example, U.S. Pat. No. 3,114,386 illustrates a top entry ball valve in which a cover plate is first removed and then the spring urged seats are pushed manually to a retracted position. The seat rings are then held in the retracted position by pins fitting in annular grooves of the seat rings. With the seat rings retracted, the ball is removed and then the seat rings may be released and removed from the valve body. When the valve is not installed in a flowline, a tool may be inserted through an open end of the valve body to force the seat rings to a retracted position. However, an in-line removal of the seat rings is extremely difficult because the ends of the valve are no longer accessible and the spring forces urging the seat rings toward the ball are oftentimes very powerful.

U.S. Pat. No. 4,175,577 discloses a top-entry ball valve design which permits the in-line removal of the ball and seats. In this design, the cover plate is removed and the ball partially rotated to expose its bore to the valve chamber whereby a camming tool may be inserted into the bore. Rotation of the ball to the full open position after the cam has been inserted results in the cam engaging an adjacent seat ring and urging the seat ring away from the ball. A plunger which is threadably connected to the valve body is then used to frictionally engage the seat springs to hold the seat assembly in the retracted position. An identical means and method is provided for retraction and retention of the other seat assembly such that the ball can then be removed and the seat assemblies then released for their easy removal.

A disadvantage of this design, however, is that a specially designed tool is required. Also plunger assemblies must be provided and openings formed in the valve body for their accomodation which adds to the complexity and costs of valve manufacture. In addition, with very large valves, there must be a very strong frictional contact of the plunger with the valve springs which is not always readily attainable and not always reliable.

It is therefore an object of this invention to provide a means and method for the easy and efficient in-line removal of the ball and seat rings of a ball valve.

It is also an object to provide a means for the removal of the ball and seat ring assemblies of a ball valve which does not require special tooling.

A further object is the design of a ball valve which allows for easy and quick pressure loading of the ball valve seats against the ball valve element.

SUMMARY OF THE INVENTION

The invention relates to a top-entry ball valve comprising a valve body having a flow passage therethrough, a ball valve element mounted therein for rotation between open and closed positions relative to the flow passage and having a bore therethrough which is in communication with the valve flow passage when in the open condition, and a pair of annular valve seat assemblies disposed on opposite sides of the ball valve element in surrounding relation to the flow passage. The ball valve element is provided with a stem which extends through a cover plate of the valve and is connected to a handle or actuator for turning the ball. Each valve seat assembly is comprised of a seat ring having an annular resilient sealing element mounted in the front face thereof and adapted to sealingly engage the ball valve element when the valve seat assembly is in the pressure loaded condition. Each seat ring is comprised of a reduced external diameter rear portion and an enlarged external diameter forward portion which defines an annular shoulder facing the bottom of the seat pocket. Three pins are mounted in the seat ring in equiangular spaced relation thereabout and extending from the annular shoulder of the ring in substantially coaxial relation with the ring axis. A spacer ring is disposed on the seat ring in sleeved relation about the reduced diameter portion of the seat ring and is provided with three recesses or bores therein which are arranged in equiangular spacing and adapted to receive the pins therein. The spacer ring is mounted on the seat ring for movement between a first position wherein the spacer ring is engaged by the tips of the pins and is held spaced from the shoulder of the seat ring and a second position controlled by rotational orientation of the spacer ring to the seat ring with the pins received in the recesses of the spacer ring. In the second position the spacer ring engages the shoulder of the seat ring and the seat assembly is in its retracted condition. An assembly of annular wave springs also sleeved about the reduced diameter of the seat ring and disposed to engage the spacer ring and a shoulder of the seat pocket provides a force for continuously urging the spacer ring towards the shoulder of the seat ring and the valve seat assembly towards sealing engagement with the ball valve element. To facilitate rotational orientation of the spacer ring on the seat ring, a projecting pin means is provided on the front face of the spacer ring which, when the cover plate of the valve is removed, may be engaged by a pry bar or lever to force relative rotary movement between the spacer ring and seat rings. A pry bar may also be used to separate the spacer ring from the seat ring shoulder and re-orient the spacer ring so that the spacer ring is in its first operational position and the seat ring assembly is in its loaded condition in sealing relation with the ball element. Placing the spacer ring in the second position, causes retraction of the valve seat assembly from the ball element and adapts the valve for in-line removal of ball and seats.

BRIEF DESCRIPTION OF THE DRAWINGS

In the accompanying drawings which form part of the specification and are to be read in conjunction therewith.

Figure 1:
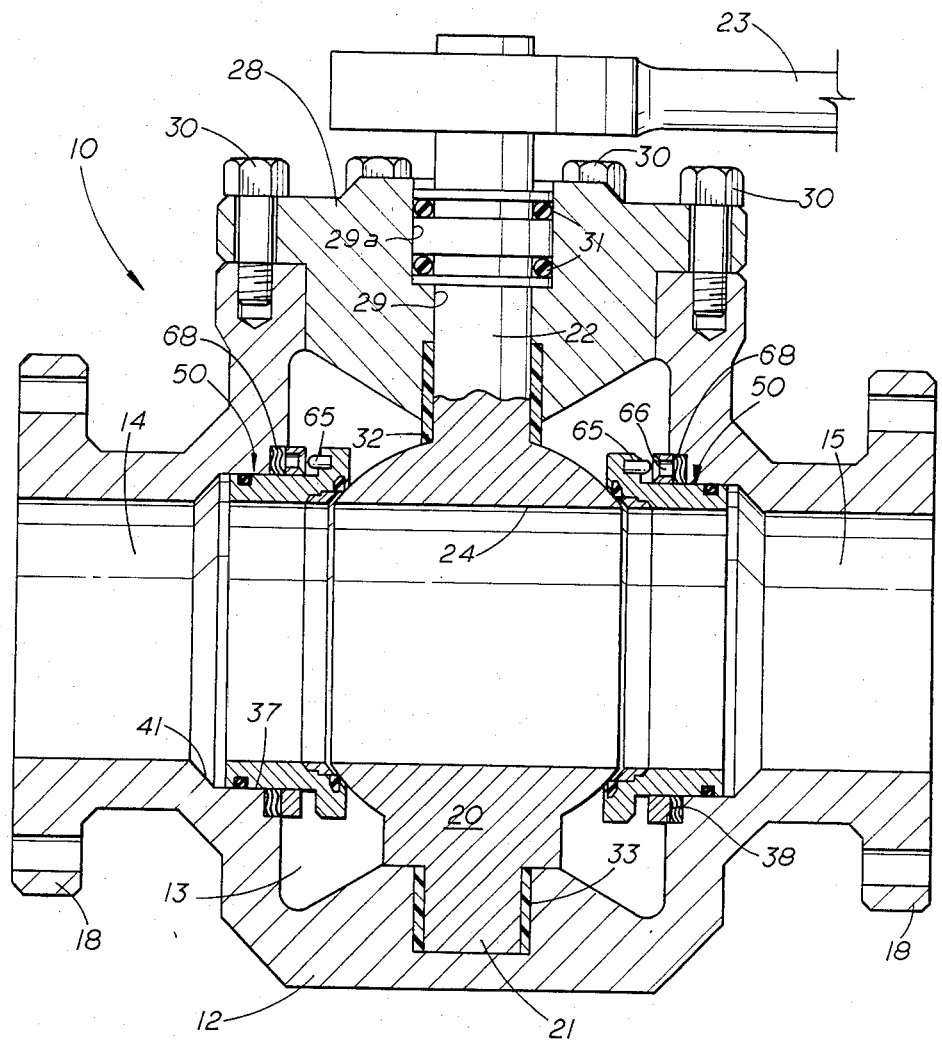
FIG. 1 is a cross-sectional view of a ball valve of the top-entry type which embodies the unique valve seat assemblies of the present invention and showing the valve seats in loaded sealing condition.

Referring now to the drawings, and more particularly to FIG. 1, a ball valve 10 is illustrated therein which includes a valve body 12 having a central valve chamber 13 and flow passages 14, 15. The flow passages 14, 15 extend from opposite ends of the valve body 12 and communicate with the valve chamber 13. Although fluid may flow through the valve body in either direction through the passages 14, 15, for purposes of description, it may be assumed the flow passage 14 is the inlet and the flow passage 15 is the outlet of the valve body. To facilitate installation of the valve in a flowline, the valve body 12 is provided at each end with an annular flange 18 in surrounding relation to the flow passages.

Within the valve chamber 13, a ball valve member 20 is mounted for turning movement therein between open and closed positions. A lower trunnion 21 is mounted on the lower side of the ball valve member 20 and a valve stem 22 is secured to the ball valve member 20 in diametrically opposed relation to the trunnion 21. The stem 22 has a handle 23 which may be gripped for turning the ball member 20 between the open and closed positions relative to the flow passages 14, 15. A flow passage 24 is provided through the ball member 20 which is adapted to be aligned with the flow passages 14, 15 when the ball member 20 is in the valve open position as shown in FIG. 1.

An upper cover plate 28 is removably connected to the valve body 12 by suitable studs 30 and has a central bore 29 extending therethrough which accommodates the valve stem 22. The mounting of the cover plate allows removal of the ball valve member 20 from the valve body without disturbing end connections of the valve. A pair of O-rings 31 fitted about the stem 22 seal between the stem 22 and the wall of an enlarged portion 29a of the bore 29. Stainless steel sleeves 32, 33 about the stem and lower trunnion, respectively, are surface coated with TEFLON and serve as bearings to facilitate opening and closing the valve.

The valve body 12 at the juncture of flow passages 14, 15 with the valve chamber 13 has an opposing pair of annular seat pockets 35, defined by successive bore enlargements of the flow passages 14, 15. For each seat pocket the bore enlargements at the juncture of a flow passage 14 or 15 with the valve chamber is represented by an intermediate diameter bore portion 37 and an enlarged diameter bore portion 38. The seat pockets 35 are of identical configuration and identical reference numerals are used in their description. A tapered annular shoulder 41 connects the bore of the flow passage with the intermediate bore position 37 and an annular shoulder 42 in a radial plane about the flow passage and facing the valve chamber 13 is defined by the enlarged bore portion 38.

In the improvement of the present invention, valve seat assemblies 50 are fitted within the seat pockets 35, for floating axial movement towards or away from the ball valve member 20. Each valve seat assembly 50 is comprised of an outer seat ring 51, an inner seat ring 52 which is sleeved therein, and a spacer ring 53. The outer seat ring 51 comprises a reduced external diameter portion 51a of a diameter corresponding substantially to that of the intermediate bore portion 37 of the seat pocket but with small clearance so as to be slidably received therein. The outer seat ring 51 also includes an enlarged external diameter portion 51b of a diameter corresponding substantially to that of the enlarged bore portion 38 of the seat pocket but with a small clearance.

An annular radial shoulder 51c is formed on the outer seat ring 51 at the juncture of the dual diameter ring portions 51a, 51b. The bore of the outer seat ring is successively englarged near the end of the ring 51 which faces the ball valve member 20 by successive enlarged bore portions 55, 56. The inner seat ring 52 is provided with dual external diameters corresponding substantially to the diameters of the bore portions 55, 56, so as to be slidably received therein. An annular groove 58 is formed in the inner wall of the outer seat ring 51 closely adjacent the end of the seat ring 51 and receives an annular sealing element 59 therein. The annular sealing ring 59 is generally rectangular in radial cross section conforming to the cross-section of the groove 58 and is preferably formed of a resilient rubber or elastomer material. As the valve seat assembly is assembled, the sealing element 59 is held clamped between the inner seat ring 52 and the outer seat ring 51. The axial dimension of the inner ring 52 is such that when the inner ring 52 is fully received in the ring bores 55, 56, only a portion of the inner surface 61 of the sealing element 59 is covered by the external surface of the inner ring 52. Accordingly, the forward inner edge of the sealing element 59 is adapted to engage the ball valve member 50 when the seat assembly 50 is urged against it. It is also to be noted that the bore of the outer seat ring 51 is formed with a frusto-conical surface 63 which is exposed at the front face of the outer ring 51. In similar fashion a frusto-conical surface 52a is provided at the front face of the inner ring 52. The frusto-conical surfaces 63 and 52a are adapted to provide metal-to-metal seals with the ball 20 in the event of destruction of the elastomer seal 59 as may be induced by elevated temperatures or chemical deterioration.

For a top-entry ball valve, it must necessarily be such that the valve seat assembly can be retracted or displaced outwardly away from the ball valve member so that the ball valve member can easily be inserted for valve assembly or removed from the valve body for repair or replacement of the seats or the ball itself. It must also be adaptable to sealingly engage the ball valve member 20 during valve operation. For accomplishing these goals, the seat assembly 50 utilizes the spacer ring 53 which is sleeved about the reduced diameter portion 51a of the seat ring 51. As shown in FIG. 1, the spacer ring 53 is held away from engagement with the shoulder 51c of the outer seat ring 51 by three pins 65, which extend from the shoulder 51c in the axial direction of the ring. The pins 65 are equal in length, are equiangularly spaced about the seat ring 51, and are press fit into blind bores drilled into the shoulder 51c. The front face 53a of the spacer ring is thereby engaged at three points by the three pins 65. Since the three points establish a plane, manufacturing tolerances can be relatively liberal because the spacer ring can maintain contact with the three pins without rocking.

For continuously urging the valve seat assemblies towards the ball valve member 20 so as to establish sealing engagement therewith, a continuous wave spring assembly 66 is positioned within the enlarged diameter bore portion of the seat pocket so that one side of the spring assembly 66 contacts the shoulder 42 and the other side of the spring assembly abuts the rear face 53a of the spacer ring 53. Accordingly, the annular sealing element 59 is urged into contact with the surface of the ball valve member 20 and establishes a sealing relationship therewith during operation of the valve and which relationship is maintained during the open and closed conditions of the valve. The spring assembly 66 is shown as comprising three wave springs arranged in parallel "nesting" relationship so as to provide a very strong force for biasing the seat assembly against the ball valve member 50. Although such a spring means is preferred, it is obvious that a coil spring or other varieties of spring means could also be utilized.

It is also to be noted that an O-ring 75 is mounted in an annular groove 76 formed about the reduced diameter portion 51a of the outer seat ring 51 near the end of the seat ring 51 which faces the bottom of the seat pocket. The O-ring 75 establishes a seal between the seat ring assembly and the cylindrical wall of the seat pocket 35. Accordingly, after an initial seal with the ball element 20 is established by the sealing element 59, the seat assembly is pressure energized by flowline pressure to further enhance the seal.

Figure 2:
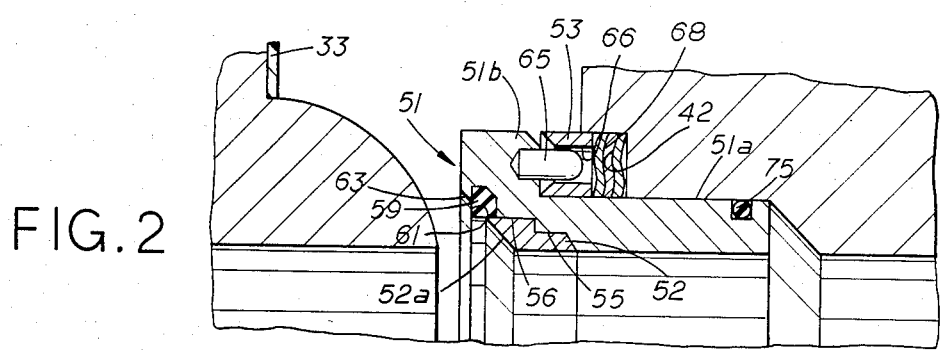
FIG. 2 is a fragmentary enlarged cross-sectional view of a portion of the valve of FIG. 1, showing a seat ring assembly in the retracted unloaded condition.
Figure 3:
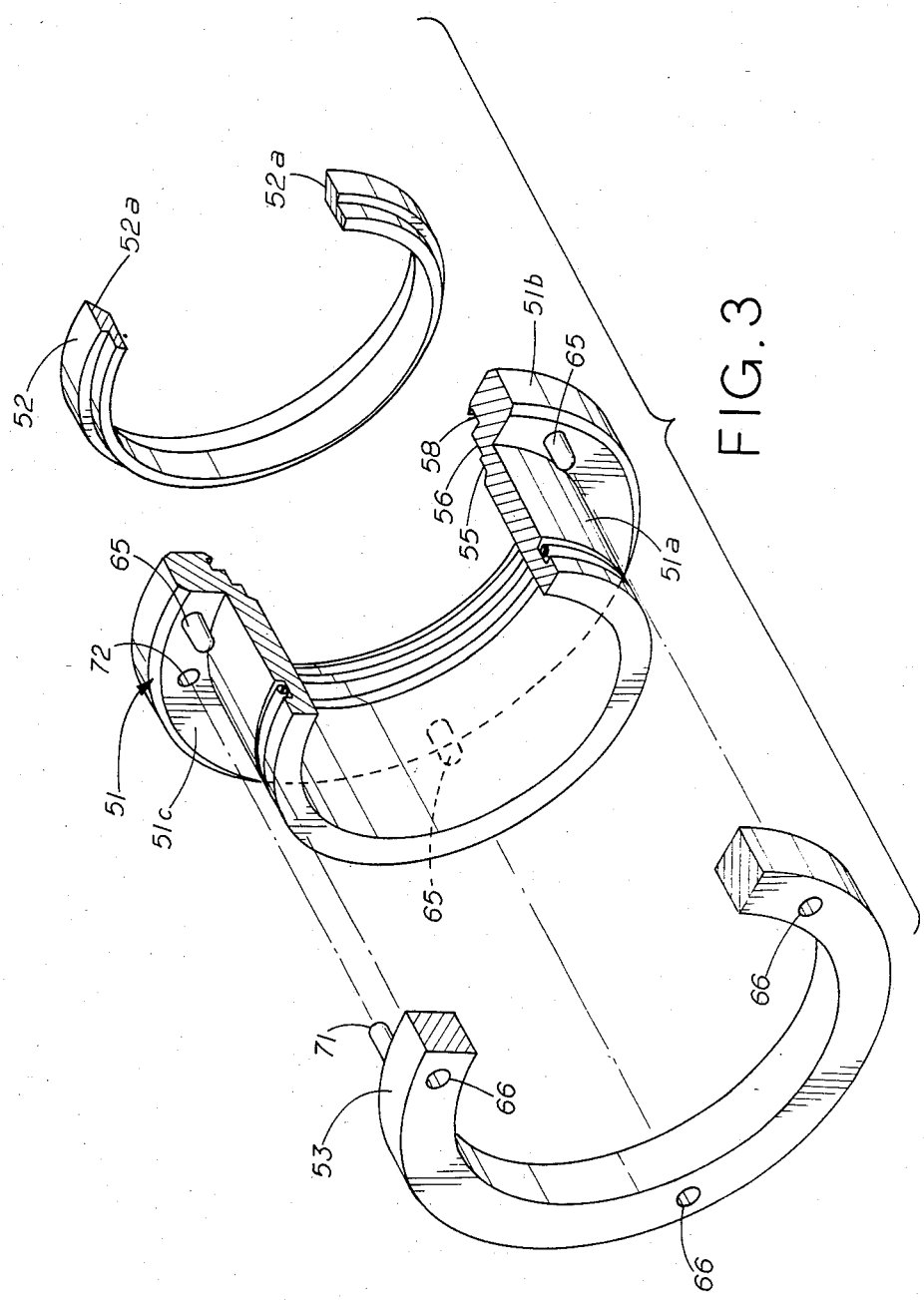
FIG. 3 is an exploded view in perspective of one of the valve seat assemblies of the valve of FIG. 1 with parts broken away for purposes of illustration.

To facilitate a retraction of the seat assembly, so that the seat assembly is moved away from the ball valve member 20 as shown in FIG. 2, the spacer ring 53 is provided with three bores or recesses 68 which are equiangularly spaced about the spacer ring 53 as seen in FIG. 3. The recesses 68 are adapted to receive the pins 65 therein when the spacer ring 53 and outer seat ring 51 are rotated relative to one another such that the pins 65 and recesses 68 are axially aligned. When so aligned, the spacer ring 53 is urged into engagement with the shoulder 51c of the seat ring 51 and there is a retraction of the seat ring assembly away from the ball valve element 20 and the seat assembly moves toward the bottom of the seat pocket.

In assembling the valve, the seat assembly 50 is placed in the condition wherein the spacer ring 53 abuts the shoulder 51c of the seat ring 51. In this position, the pins 65 are received in the recesses 68 of the spacer ring. When both seat assemblies are placed in the seat pockets, the seat rings 51 may then be placed in the loaded sealing condition against the ball 20 by separating the spacer ring 53 from the shoulder 51c. This can be easily accomplished by use of a pry bar inserted between the spacer ring 53 and the shoulder 51c and then effecting a relative rotation of the spacer ring 53 on the seat ring 51 such that the face of the spacer ring engages the tips of the pins 65. A projecting pin 71 installed by a press fit into a bore 72 in the spacer ring 53 extends from the face of the spacer ring and provides a surface against which force may be applied by the pry bar to effect rotation of the spacer ring. It is to be noted that the open ends of the pin receiving bores 68 are bevelled to ease entry of the pins and also avoid damage to the tips of the pins. Also, the annular edge of the seat ring 51 at the periphery of the shoulder 51c is also bevelled to facilitate wedging of a pry bar between the seat ring and spacer ring.

It will therefore be seen that a unique ball valve design is disclosed herein which permits for efficient assembly of the valve and very easy and efficient removal of the ball and valve seat assemblies while the valve is installed in a flowline.

During initial assembly of the valve, or a replacement of seats while the valve is in-line, the seat assemblies are placed in the seat pockets in the unloaded condition wherein the spacer ring 53 engages the seat shoulder 51c. With both seat assemblies thus installed and the ball mounted in the valve chamber, the seat assemblies can then be placed in the loaded condition, by use of a pry bar to separate the spacer ring from the shoulder 51c and effect a relative rotation between the spacer ring 53 and seat ring 51. The action of the spring assembly 66, then urges the seat ring 51 into the loaded condition in sealing relationship with the ball 20. The cover plate 28 may then be bolted to the valve body 12 and handle affixed to the valve stem 22 to place the valve in condition for operation. A very unique, yet simple and reliable top-entry ball valve is thus assembled.

It is nevertheless to be understood that the foregoing description of a preferred embodiment of the invention has been presented for purposes of illustration and description and is not intended to limit the invention to the precise form disclosed. For example, the seat assembly need not be provided with an inner seat ring 52 as there are other means of providing for a sealing element in the face of the seat ring 51. The number of pins 65 projecting from the seat ring shoulder 51c might also be more than three although three is much to be preferred. In addition, they need not be equally spaced. The top-entry ball 10 may also be of other designs in the details thereof. It is to be appreciated therefore, that changes may be made by those skilled in the art without departing from the spirit of the invention.

What is claimed is:

1. A ball valve comprising a valve body having a valve chamber and inlet and outlet flow passages communicating therewith, a ball valve element mounted within said valve chamber for rotational movement between first and second positions to open and close the valve, a pair of seat pockets formed in the valve body at the ends of the passages which opens to the valve chamber, each seat pocket including a reduced diameter section and an enlarged diameter section forming a radial shoulder in the seat pocket at its juncture with the reduced diameter section, a pair of valve seat assemblies positioned in said seat pockets at opposed sides of the ball valve element, each said valve seat assembly comprising an outer seat ring having an annular sealing element mounted in the end of the ring facing the ball element and adapted to establish a seal therewith which seals the flow passage from the valve chamber, said outer seat ring including a reduced diameter portion received in the reduced diameter section of the seat pocket but of a diameter corresponding substantially therewith, and an enlarged diameter portion received in the enlarged section of the seat pocket and defining an annular radial shoulder on the seat ring; at least three projecting pins mounted on said seat ring to extend from said annular radial shoulder of the seat ring in a direction generally coaxial with the ring axis, said pins being substantially equal in length and spaced about the ring in generally equiangular spacing;

a spacer ring mounted on the reduced diameter portion of the seat ring in sleeved relationship therewith, said spacer ring having at least three recesses formed therein in a configuration and spacing conforming to that of said pins whereby the pins are adapted to be received in said recesses, said spacer ring being rotably movable and slidable on said seat ring between a first position wherein the spacer ring engages the tips of the pins and is spaced from the annular shoulder of the seat ring and a second position wherein the pins are received in the recesses and the spacer ring is in juxtaposed engagement with the seat ring; and a spring means mounted in the seat pocket between the spacer ring and the radial shoulder of the seat pocket to continuously urge the spacer ring towards said seat shoulder and thereby urge the seat assembly into loaded sealing engagement with the ball valve element when the spacer ring is in its first operational position, said seat assembly being retracted from the ball valve element when the spacer ring is in its second operational position.

2. A ball valve as set forth in claim 1 wherein said spacer ring is provided with a projecting element thereon which is adapted to be engaged by a pry bar for urging rotation of the spacer ring on said seat ring to place the spacer ring in either of the first or second operational positions.

3. A ball valve as set forth in claim 1 where said valve is a top-entry ball valve having a cover removably mounted on the valve body which may be removed from the valve body to permit insertion of a pry bar into the valve chamber for manipulating the spacer ring on the seat ring.

4. A ball valve as set forth in claim 1 wherein each valve seat assembly further includes an inner retainer seat ring which is received in the bore of the outer seat ring and engages a portion of the inner surface of said sealing element to clamp the sealing element in the valve seat assembly whereby the sealing element is adapted to sealingly engage the ball valve element and form an annular seal about the flow passage when the spacer ring is in its first operational position and the seat assembly is engaged with the ball valve element.

5. A ball valve as set forth in claim 1 wherein the annular surfaces of the seat ring assembly which face the ball valve element are of frusto-conical configuration and are adapted to establish metal-to-metal sealing relationship with the ball valve element in the event of destruction of the sealing element.

* * * * *